April 4, 1944. E. M. BRIGHT 2,346,101
PROCESS AND APPARATUS FOR CURING PLASTIC COATINGS
Filed Feb. 17, 1941
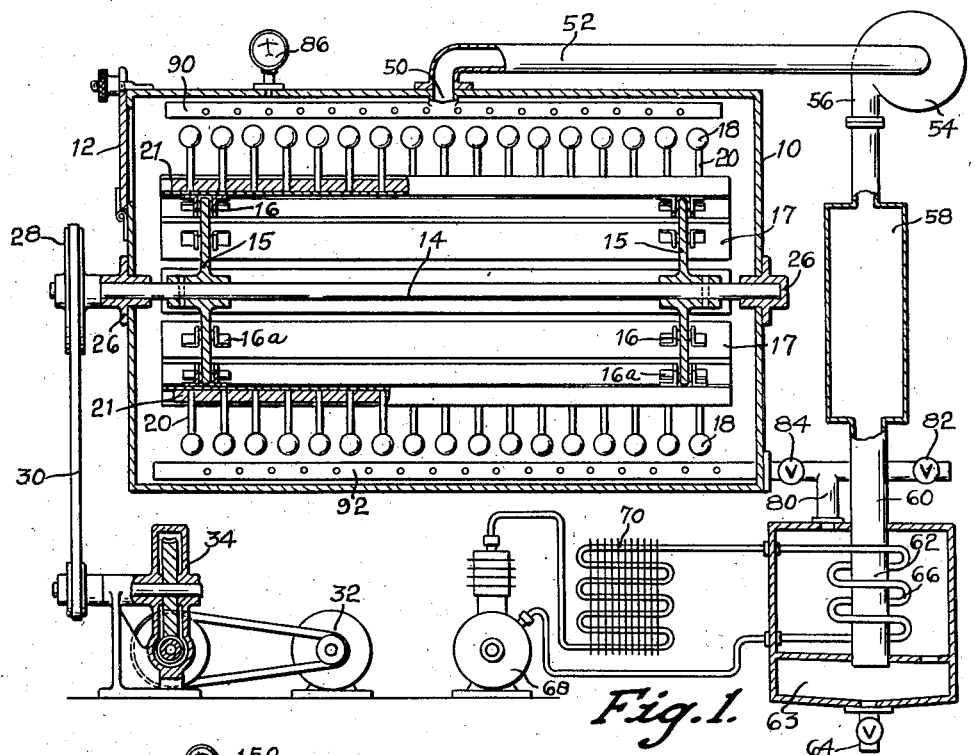
Fig.1.
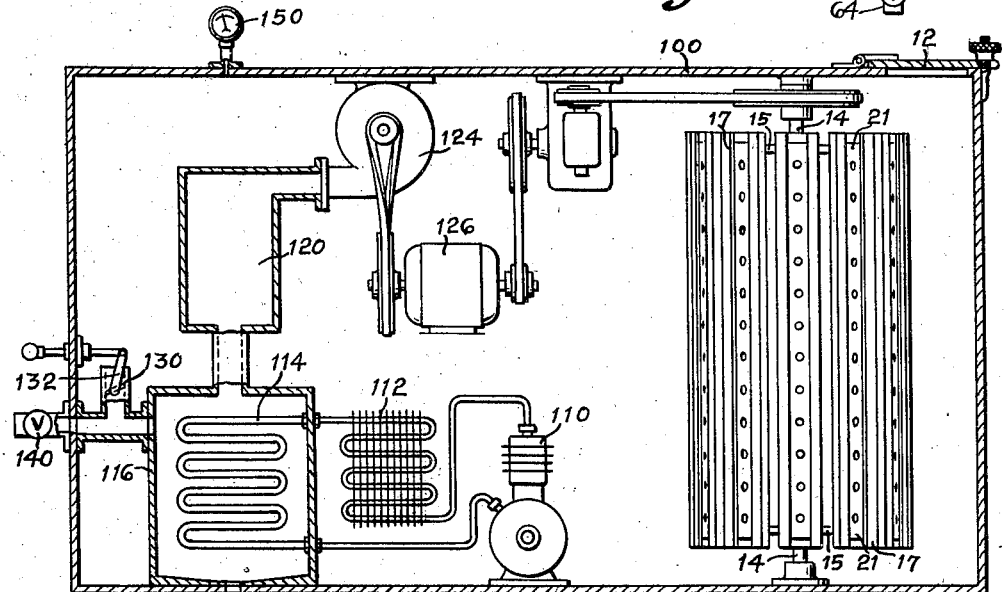
Fig.2.
Fig.3.
INVENTOR
Elvin M. Bright
BY
Henry G. Dybvig
ATTORNEY Patented Apr. 4, 1944

2,346,101

UNITED STATES PATENT OFFICE 2,346,101

PROCESS AND APPARATUS FOR CURING PLASTIC COATINGS

Elvin M. Bright, Whitefish Bay, Wis., assignor to Plastic Veneering, Inc., Milwaukee, Wis., a corporation of Wisconsin Application February 17, 1941, Serial No. 379,321

18 Claims. (Cl. 34—15)

This invention relates to a process of and apparatus for curing a coating and more particularly to a process of curing a coating that includes a highly volatile solvent having a tendency to boil and form blisters, pin holes and high surface shrinkage forming deep wrinkles and surface defects when cured under normal atmospheric conditions.

An object of this invention is to cure a coating by rapidly removing the solvent without mutilating or marring the surface thereof.

Another object of this invention is to cure a coating having a highly volatile solvent therein, by utilizing a controlled medium contacting the surface of the article, which medium extracts the solvent rapidly without deleterious effects upon the surface of the coating.

Another object of this invention is to cure a coating including a highly volatile solvent by subjecting the coating to the influence of dehydrated air at a subatmospheric pressure.

Another object of this invention is to control the atmosphere surrounding the article, so as to cause the dew-point of the air to be at a lower temperature than the dew-point of the outside atmosphere.

Another object of this invention is to control air at a subatmospheric pressure, which air surrounds the article, so as to cause the dew-point of the air to be at a lower temperature than the dew-point of the outside atmosphere and to control the flow of solvents from the freshly applied coating.

Another object of this invention is to produce a device for dehydrating air used in curing the articles, which device in addition to dehydrating the air creates a subatmospheric pressure for the air in the curing compartment.

Another object of this invention is to provide a device that subjects the articles to be cured to dehydrated air supplied to the articles at a subatmospheric pressure.

Another object of this invention is to provide a device for curing articles, which device conditions the air so as to supply the curing compartment of the device with air that has a dew-point considerably lower than the dew-point of the outside atmosphere.

Another object of this invention is to provide a device for removing excess solvent fumes from dehydrated subatmospheric pressure air supplied to the articles during the curing process.

Another object of this invention is to maintain a critical and proper control of vapors from the solvents and the pressure thereof.

Another object of this invention is to maintain a critical and proper control of the vapor solvents circulating through the system.

Another object of this invention is to control the circulation of the vapors of the volatile solvents maintained at subatmospheric pressures in the curing compartment.

Another object of this invention is to provide a device for dipping articles in a coating material and for curing the freshly dipped coating.

Another object of this invention is to provide a device for dipping articles in a coating solution and curing the dipped articles in a gaseous fluid medium having a controlled pressure and quantity of solvents therein.

Another object of this invention is to provide a device adaptable for curing articles, which device is efficient dependable and economical in affecting a cure of coatings.

Another object of this invention is to provide a device for extracting solvents from plastic materials.

Other objects and advantages reside in the construction of parts, the combination thereof and the mode of operation, as will become more apparent from the following description.

In the drawing,

Figure 1 is a schematic view of an apparatus adaptable for carrying out a process of removing highly volatile solvents from a coating after applying the coating material to the article.

Figure 2 discloses a modification thereof.

Figure 3 is a fragmentary perspective view of the article supporting device.

In curing certain types of coatings, oftentimes referred to in the industry as plastic coatings, such as nitrocellulose and other cellulose coatings and derivatives thereof, resinous and synthetic coating materials, usually dissolved by a highly volatile solvent, difficulty is encountered in extracting the solvent from the coating, so as to prevent boiling of the solvent within the coating during the curing operation. If the solvent boils, the solvent forms blisters or bubbles within the coating, which blisters often leave pin holes or small dimples in the surface of the article. Such a surface is sometimes referred to as a pock marked surface, in that it is pitted and irregular. This condition may be aggravated by the uneven compression of the outer coating that may be drier than the rest of the coating. The contraction of the rapidly drying outer surface compresses the vapors within the surface.

Numerous attempts have been made to perfect processes for preventing solvents from boiling.

Attempts have been made to subject the article immediately after dipping to a freezing temperature, so as to congeal the coating and retard evaporation and thereby prevent boiling. The solvent has also been removed by the use of extraction liquids preferably applied cyclically, so as to permit the control of the osmotic pressure within the coating to prevent boiling.

In the process disclosed herein, no subnormal temperature is used and no fluid extraction method is used; but instead, dehydrated air at normal temperatures or heated air is supplied to the article at a subatmospheric pressure, which air contains a sufficient amount of fumes of the solvent used in dissolving the coating material to prevent evaporation of the solvent at a rate which would cause the solvent to boil. This has been accomplished by the use of a closed circulatory system including a vessel or a compartment containing the articles to be cured, a dehydrator for removing moisture from the air, a suction pump or vacuum pump for circulating and lowering the atmospheric pressure in the air and a condenser for removing surplus solvent from the coating material.

The article to be coated is first dipped into suitable coating material dissolved by a suitable solvent, preferably a highly volatile solvent. The process of dipping the article may take place under ordinary atmospheric conditions. Immediately upon removing the article from the dipping solution, evaporation of the solvents begins. As the solvents evaporate, heat is absorbed, thereby cooling the surface of the article. As the surface of the article cools very rapidly, water is precipitated upon the surface of the article from the air, especially during humid weather. The dipped article is placed in a curing compartment as soon as convenient. This curing compartment is sealed. It contains air. The air is dehydrated so as to remove all moisture from the air. Furthermore, the pressure is reduced. For some types of coatings and solvents, the pressure of the air within the curing compartment may be three pounds below atmospheric pressure. This dehydrated rare air rapidly evaporates the moisture on the surface of the coated article. The dehydrated air has a tremendous affinity for water. The dew-point of this dehydrated air is extremely low. That being the case, it can readily be seen that the moisture that is condensed upon the surface of the article is evaporated very rapidly, thereby cooling the surface of the article. The air in the compartment used in curing the articles contains large quantities of fumes from the solvents. Thus, evaporation of the solvents is controlled, so as to permit the solvents within the coating to flow to the surface, thereby softening the surface. As the surface softens, it has a tendency to smoothen the surface, so as to eliminate all traces of wrinkles and irregularities in the surface caused by the precipitation of moisture from the air. This results in a perfectly smooth surface. This is accomplished by circulating the air through the compartment, through a dehydrator and then passing it through a condenser for removing or condensing some of the fumes of the solvent found in the air. The air is preferably returned to the curing compartment, in readiness to withdraw further solvent from the coating material.

The above explanation of the dew-points and phenomena of operation has been advanced as a plausible explanation. Whatever the reason may be, the coating is cured in a comparatively short period of time. Any irregularities formed upon the coating immediately after it is dipped and before it is inserted in the curing compartment are completely eliminated, so as to remove all traces thereof. For the purposes of illustration, the following apparatus may be used in curing the articles.

Referring to the drawing, the reference numeral 10 indicates a sealed compartment provided with a suitable loading door 12. The door 12 when in closed position seals the compartment. The door is opened so as to place the articles to be cured in the compartment and to remove the articles after the completion of the process. Instead of providing a door in the end of the compartment, the door may be mounted in the side of the compartment, or an entire side or an entire end may be removed bodily, so as to permit loading and unloading of the compartment.

The compartment 10 is provided with a rotatably mounted shaft 14 supporting a pair of sprocket-wheels 15 keyed to the shaft. Each of the sprocket-wheels is provided with a chain 16. Each chain has a length substantially equal to the periphery of its sprocket-wheel, so that there are as many links as sprockets on the wheel. When these chains are placed in position, they snugly fit the wheels. Each of the chains 16 is provided with laterally projecting lugs 16a, having attached thereto channel bars 17, there being a channel bar for each pair of links. These channel bars extend parallel to the shaft 14 and are adapted to receive rectangular supporting bars 21 carrying a plurality of spindles 20. These spindles 20 support the coated articles 18, which, for the sake of convenience, have been shown as knobs. The supporting bars 21 are slid into the channels from the end of the channel bar 17, so as to load the rack assembly, including the channel bar 17 mounted upon the chain 16 supported upon the sprocket-wheels 15, with articles to be cured. There is preferably one supporting bar 21 for each channel bar 17.

The ends of the shaft 14 are mounted in suitable sealed bearings 26 in the ends of the sealed compartment 10. One end of the shaft 14 supports a drive pulley 28 driven by a suitable belt or chain 30 from an electric motor 32, provided with a speed reducing mechanism 34, so as to slowly rotate the rack assembly supported upon the shaft 14. This permits loading of the rack assembly through the door 12. As each channel bar 17 passes the door, the supporting member 21, supported in the channel bar, is slipped out and a new bar with freshly coated articles thereon substituted therefor. By properly timing the rotation of the rack assembly, it is possible to rapidly unload the machine through this door 12 and reload it through this same door.

Instead of having a continuously rotating motor for driving the shaft 14, an intermittently driven motor could be used for advancing the rack assembly, so as to cause each channel bar to register in turn with the opening in the door. The rack assembly may be rotated during the curing operation if it is desirable, although it is not necessary to do so, as the coating is cured very rapidly before the coating has time to sag on the article. Whether or not it is necessary to rotate the articles during the curing operation depends upon the type of coating used and the rate at which the coating is cured.

The articles 18 are preferably coated by dipping the articles into a solution of coating material which has been dissolved by a highly volatile solvent, such as acetone (CH₃)₂COCH₃. It is not difficult to apply a coating of cellulose material dissolved in acetone, which coating is one thirty-second (1/32) of an inch thick. As soon as the articles are coated by dipping or otherwise, the articles are removed from the dipping solution and mounted in the channels.

The spindles 20, of course, are designed to accommodate the articles to be coated. These spindles 20 may threadedly engage suitable apertures in the support 21. For some types of articles, instead of spindles, chucks or other types of supporting means may be used, wherein the chucks are attached to the support 21 in any suitable manner depending upon the type of support.

The dipping may take place under normal atmospheric conditions. Due to the use of highly volatile solvents for the coating material, evaporation sets in immediately upon the removal of the article from the coating material. This rapid evaporation of the solvents cools the surface of the articles, that is, the rapid evaporation of the solvents has a refrigerating effect upon the surface of the articles. It is nothing unusual for the temperature of the surface of the articles to be reduced below the dew-point of the atmosphere. Obviously, when this condition arises, moisture from the air is precipitated or condensed upon the surface of the article, marring or injuring the surface, in that the surface becomes rough, wrinkled and irregular, as described above. Although it takes only a short period of time to remove the article from the dipping vat and mount it in position upon the support 21, this period of time is sufficient for condensation to form upon the surface of the article, especially when this operation is performed in humid weather.

By the use of the devices that are now to be described, it is possible to set up artificially produced atmospheric conditions that will evaporate the water condensed upon the surface of the article and that will supply a vapor condition, which smoothens the surface. In addition thereto, these artificial atmospheric conditions rapidly evaporate the solvents without causing a boiling of the solvent. These results are obtained by the mechanism associated with the curing compartment.

The curing compartment is provided with an outlet opening 50 communicating with a conduit 52 connected to a suction pump or vacuum pump 54, having an outlet pipe 56 connected to a dehydrator 58, which may contain any suitable dehydrating chemical, such as calcium chloride, for removing moisture from the air. As the air passes out of the dehydrator 58 through a suitable conduit 60, it passes through a condensing chamber 62, hereinafter referred to as a solvent condenser 62, provided with a suitable drainage pipe 64. In the particular embodiment shown herein, the air escaping from the dehydrator 58 is cooled by the cooling member 66 supplied with a suitable refrigerant supplied by means of a compressor 68 and the refrigerant condenser 70. By passing the dehydrated air in the vicinity of the cooling member 66, the temperature of the air contacting the cooling member is reduced below the temperature of saturation of the air with fumes of the solvent, resulting in the solvent being condensed upon the cooling member 66. The condensed solvents may drip or flow to the bottom of a reservoir or receiver 63. The solvents may be drained through the pipe 64 provided with a suitable valve or pet-cock. The compressor 68 and the condenser 70 may be identical to those used in standard refrigerators, either for domestic use or for commercial use, depending upon the size. A detailed description of this mechanism will not be made for the reason that suitable refrigerating apparatus appear on the open market.

Instead of using a cooling member or coil 66, the pipe 60 could have a portion enclosed by a cylindrical member providing a passage for the refrigerant, so as to cool the exterior of the pipe, thereby causing the solvents to be condensed. The cylindrical member is preferably insulated, so as to prevent absorption of heat from the surrounding air. Any other suitable type of cooling device for condensing the solvents may be utilized.

The solvent condenser 62 is provided with an intake air passage 80, providing a passage for the air from the solvent condenser 62 to the curing compartment 10. Apertured pipes 90 and 92 are preferably connected to the outlet opening 50 and the intake air passage 80, so as to withdraw the air uniformly and so as to supply the air to the compartment uniformly. The pressure of the air within the curing compartment 10 is reduced below atmospheric pressure. This is accomplished by opening the exhaust valve 82 and closing the valve 84 in the intake passage 80. This causes the vacuum pump 54 to force the air through the dehydrator 58, through the solvent condenser 62, through the pipe 86 into the open. The exhaust valve 82 is preferably kept open until the proper pressure registers upon the gauge 86. As soon as the necessary subatmospheric condition is attained, the valve 82 is closed and the valve 84 is opened simultaneously. The exhaust valve is preferably placed in the passage between the solvent condenser 62 and the compartment 10, so as to condense the vapor fumes in the air before the air is exhausted. Furthermore, in order to prevent moisture from frosting within the solvent condenser 62, the air is passed through the dehydrator 58, so as to remove practically all traces of moisture before the air passes through the solvent condenser 62. By this arrangement, the exhaust air is dry and contains practically no solvents. Instead of using two valves, a four-way valve may be used to accomplish the same purpose.

After the proper vacuum has been attained, the air is circulated from the compartment through the dehydrator and through the condenser continuously until practically all of the solvents have been removed from the coating of the freshly coated articles. It has been found that the solvents may be removed in a very short period of time, depending entirely upon the nature of the coating, the thickness thereof and the type of solvents used. Some types of coatings may be cured sufficiently to remove, into the open air in a period of eight minutes.

For some reason, articles cured by this process seem to cure uniformly throughout the thickness of the coating. By other processes that have been used in the past, as for example, by the use of extraction fluids, the outside surface of the coating seems to cure more rapidly than the inside surface, so that upon removal, the outside surface appears to be hard, but the inside is quite soft. By the process disclosed herein, the coating seems to cure more uniformly throughout the thickness thereof.

Mode of operation

The theory that is advanced in connection with the mode of operation is offered as a plausible explanation, without in any manner affecting the validity of the patent. The freshly coated articles, preferably mounted in position on the extra supports 21, are inserted into their respective channels 17 through the door 12. While doing this, the pressure in the compartment 10 remains at atmospheric pressure. Condensation may form upon the articles before they are inserted into the compartment 10. Furthermore, during the loading operation additional condensation may form upon the surface of the articles, due to the moisture in the air that is in the compartment 10. Whenever the device is reloaded, of course, it is necessary to open the door 12, at which time air from the outside raises the pressure of the air in the compartment to atmospheric pressure. As soon as the device has been loaded, the door 12 is sealed and the vacuum pump 54 is started with the valve 82 open and the valve 84 closed. As soon as this subatmospheric pressure is reduced sufficiently, say three pounds below atmospheric pressure, as registered by the gauge 86, the valve 82 is closed and the valve 84 is opened. During the period immediately following the closing of the valves, only dry air is circulated in the system, so that within a very short period of time, dehydrated air is supplied to the compartment at subatmospheric pressure.

The operation continues. The dry air entering the compartment 10 from the circulatory system dries the moisture on the surface of the articles very rapidly. In addition thereto, the air in the immediate vicinity of the articles is practically saturated with fumes from the solvents. This is believed to cause the solvents to be uniformly distributed within the coating, thereby softening the areas that have been mutilated, marred or wrinkled by condensation forming temporarily on the surface of the articles during handling after the dipping operation and prior to the curing operation. The surface tension on the coating as it dries is believed to smoothen the surface and eliminate all wrinkles and defects.

After the articles have been cured, the vacuum pump is stopped and a suitable jet, not shown, may be opened, so as to raise the pressure within the curing compartment to atmospheric pressure, at which time the door 12 may be opened without difficulty. The cured articles are removed and freshly coated articles may be reloaded.

In the modification disclosed in Figure 2, the compressor 110, the condenser 112, the cooling coils 114, the solvent condensing chamber 116 and the dehydrator 120, together with the suction pump 124 and the driving unit including a motor 126, are all mounted within the compartment 100. The air in the compartment 100 is circulated by the vacuum pump 124 forcing the air through the dehydrator 120 into the proximity of the cooling coils 114, from whence the air returns to the compartment 100 through the outlet conduit 130, when the valve 132 is open. When the valve 132 is closed and the valve 140 is open, air is pumped or exhausted from the compartment 100 until the air pressure, as registered by the gauge 150, has been reduced sufficiently in the compartment 100. When this air pressure has been reduced as required, the valve 140 is closed and the valve 132 opened, so as to cause proper circulation of air. By this system all of the heat that is absorbed by the cooling coils 114 is transmitted back into the air in the system by the compressor 110 and the condenser 112. By this arrangement, no heat is lost, due to the use of the refrigerating device for removing solvents from the air.

The mode of operation carried out by the device disclosed in the modification in Figure 2 is quite similar to the mode of operation described in connection with Figure 1, excepting that all steps entering into the mode of operation disclosed in Figure 2 take place within the compartment 100, thereby eliminating any transfer of heat from the interior of the compartment to the exterior.

By proper control of the quantity of solvent fumes in the air in the compartment, the solvent content of the coating may be controlled, so as to dry the coating to any desired degree of solvent content therein.

For some types of installations it may be desirable to use hot air. This may be accomplished by heating the air by a suitable heating mechanism where it passes from the solvent condensing compartment to the curing compartment. The air that is removed from the curing compartment, after passing through the dehydrator, may be cooled by the atmospheric temperature or it may be water-cooled, causing the solvents in the air to be precipitated. Then the air passes through the heating coils or units, to heat the air before it returns to the curing compartment.

By this process a slightly higher pressure would be required, in order to prevent boiling of the solvents within the coating. Furthermore, this process would require a greater percentage of solvents carried in the air after the air had passed through the solvent condensing device. Whatever system is used, after the curing operation is started, the air entering the curing compartment has a certain amount of solvent therein, which tends to reduce the rate of evaporation of the solvent from the article. If the solvents evaporate too rapidly, the pressure within the coating is reduced to such an extent that boiling sets in within the coating, which is objectionable.

Instead of providing a closed air circulatory system, air may be drawn into the curing compartment through a dehydrator, then after circulating around the article to be cured, the air is exhausted by a vacuum pump through a suitable solvent condensing device into the open air. In this system it is necessary to restrict the intake of the air, so as to maintain the proper vacuum in the curing compartment.

A dipping device for the articles may be incorporated into the device for curing the articles, whereby the articles are automatically dipped and cured in the same compartment. By dipping the articles in the curing compartment, no moisture is precipitated upon the cured articles immediately after dipping, as the articles remain in controlled dehydrated subatmospheric pressure fluid medium from the time the articles are dipped until the coating is cured.

It is possible to coat hollow balls that are not sealed by first placing these in a vacuum, so as to withdraw the desired quantity of air from within the article, then dipping the articles, this followed by the curing process. If the air is not first withdrawn from the hollow article before coating, it can be readily seen that during the curing process air bubbles will form under the surface of the coating, due to the reduced pressure in the curing compartment. By carrying out the operation of dipping or coating in a partial vacuum, this difficulty is eliminated.

Although the process has been described in connection with the curing of dipped articles, the process is equally as applicable to the curing of coatings utilizing highly volatile solvents applied in any other manner, as for example by spraying or by rolling the coating material on the surface. It has been found that by spraying articles utilizing a high pressure spray gun, it is possible to cure such a coating by this process. In the past, when attempts have been made to spray such coating material, especially when extremely heavy coatings have been used, as for example a coating one sixteenth of an inch thick, the highly volatile solvents cool the coating so rapidly that not only condensation forms on the surface of the article, but frost forms on the surface, which has a very deleterious effect. By the process disclosed herein, it is possible to cure the coating irrespective of how it is applied and irrespective of the rate of evaporation. The surface after curing is always smooth and even.

Although the preferred modification of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. The process of curing a plastic coating applied by dipping the article to be coated into a coating material that has been dissolved by a highly volatile solvent, said process including the steps of subjecting the freshly dipped coating to dehydrated circulating air at room temperature, said air being maintained at a subatmospheric pressure sufficiently low to rapidly withdraw the solvents at a pressure higher than the pressure which causes the solvent to boil, and condensing the fumes of the solvent from the air so as to control the amount of the solvent fumes in the air.

2. The process of curing a coating material applied to the surface of an article, which coating material has been dissolved in a highly volatile solvent, said process including the step of removing the solvent from the coating by subjecting the coated article to dehydrated air maintained at a subatmospheric pressure and at room temperature.

3. The process of curing a coating material applied to the surface of an article, which coating material has been dissolved in a highly volatile solvent, said process including the step of removing the solvent from the coating by subjecting the freshly coated article to the influence of air having a dew-point considerably lower than the atmospheric dew-point, said air being maintained at room temperature, said air being reduced to a pressure lower than the atmospheric pressure.

4. A device for curing a coating dissolved in a highly volatile solvent, which coating is applied to the surface of articles, said device including a closed air circulatory system including a sealed chamber, means for creating a partial vacuum in the chamber, means for dehydrating the air, and means for removing a part of the solvent fumes from the air so as to produce an atmospheric condition wherein the dew-point of the air in the chamber is lower than the atmospheric dew-point.

5. A device for curing a coating dissolved in a highly volatile solvent, which coating is applied to the surface of the articles, said device including a chamber having an intake opening and an outlet opening, means for supplying dehydrated air to the intake opening, exhaust means for withdrawing air from the outlet opening, a solvent condensing device removing solvent fumes from the air withdrawn from the chamber, and means associated with said exhaust means to create a vacuum in the chamber.

6. A device for curing freshly coated articles which are coated with a coating material dissolved in a highly volatile solvent, said device including a curing compartment, means for supporting the articles in the curing compartment, means for dehydrating the air in the compartment, means for reducing the pressure in the compartment to subatmospheric pressure, and means for removing solvent fumes from the air, said means including heat transferring means for temporarily cooling a portion of the air from the curing compartment causing condensation of the fumes of the solvent from the cooled air, said heat transferring means reheating the cooled air to prevent heat losses.

7. A process of curing freshly coated articles which are coated with a coating material dissolved in a highly volatile solvent, said process including the steps of subjecting the coated articles to dehydrated air at room temperature, reducing the pressure of said dehydrated air to subatmospheric pressure, removing solvent fumes from the rare dehydrated air by temporarily cooling portions of the air to condense solvent fumes therein, and reheating the cooled air to prevent heat losses.

8. A device for curing a coating dissolved in a highly volatile solvent, which coating is applied to the surface of articles to be coated, said device including a sealed chamber housing the articles during the curing of the freshly applied coating, an outlet conduit having a passage communicating with the sealed chamber, a vacuum pump connected to the outlet conduit, a dehydrating unit connected to the vacuum pump, a solvent condensing unit connected to the dehydrating unit, and intake conduit means for interconnecting the solvent condensing unit to the sealed chamber, said intake conduit means having an exhaust passage, a valve for closing the exhaust passage, and a second valve for closing the intake conduit means between the exhaust passage and the sealed chamber so that by opening the exhaust valve and closing the second valve air is exhausted from the sealed chamber.

9. A device for curing a coating dissolved in a highly volatile solvent, which coating is applied to the surface of articles to be coated, said device including a sealed chamber housing the freshly coated articles during the curing process, an outlet conduit having a passage communicating with the sealed chamber, a vacuum pump connected to the outlet conduit, solvent condensing means, means for interconnecting the solvent condensing means to the outlet of the vacuum pump and intake conduit means for interconnecting the solvent condensing means to the sealed chamber, said intake conduit means having an exhaust passage, a valve for closing the exhaust passage and a second valve for closing the intake conduit means between the exhaust passage and the sealed chamber so that by opening the exhaust valve and closing the second valve air is exhausted from the sealed chamber.

10. A device for curing a coating dissolved in a highly volatile solvent, which coating is applied to the surface of articles to be coated, said device including a sealed chamber housing the freshly coated articles during the curing process, an outlet conduit having a passage communicating with the sealed chamber, means for dehydrating the air in the sealed chamber, a vacuum pump connected to the outlet conduit, solvent condensing means, means for interconnecting the solvent condensing means to the outlet of the vacuum pump and intake conduit means for interconnecting the solvent condensing means to the sealed chamber, said intake conduit means having an exhaust passage, a valve for closing the exhaust passage and a second valve for closing the intake conduit means between the exhaust passage and the sealed chamber so that by opening the exhaust valve and closing the second valve air is exhausted from the sealed chamber.

11. A device for curing a coating dissolved in a highly volatile solvent, which coating is applied to the surface of articles to be coated, said device including a sealed chamber enclosing the freshly coated articles during the curing process, means for condensing solvent fumes escaping from the coated articles in the sealed chamber, an outlet conduit having a passage communicating with the sealed chamber, a vacuum pump connected to the outlet conduit, dehydrating means connected to the vacuum pump, and intake conduit means for interconnecting the dehydrating means to the sealed chamber, said intake conduit means having an exhaust passage, a valve for closing the exhaust passage, and a second valve for closing the intake conduit means between the exhaust passage and the sealed chamber so that by opening the exhaust valve and closing the second valve air is exhausted from the sealed chamber.

12. A device for curing a coating dissolved in a highly volatile solvent, which coating is applied to the surface of the articles to be coated, said device including a sealed chamber housing the articles during the curing of the freshly applied coating, a vacuum pump, a dehydrator unit and a solvent condensor unit mounted within the sealed chamber for dehydrating the air and for condensing the solvent fumes in the air in the sealed compartment.

13. A process of curing a coating material applied by dipping the article to be coated into a solution of coating material dissolved in highly volatile solvents, said process including subjecting the freshly dipped coated article to dehydrated circulating air at room temperature, maintaining the pressure of the dehydrated air at the subatmospheric pressure, removing the dehydrated air having fumes from the solvent from the article, removing the moisture content of the air as it is removed from the articles, condensing the fumes from the solvent from the removed air, and returning the air to the vicinity of the dipped article.

14. The process of curing a coating material applied to the surface of an article by dipping the article to be coated into a coating material dissolved in a highly volatile solvent, said process including the steps of subjecting the freshly dipped coated article to dehydrated subatmospheric pressure air maintained at room temperature, circulating the dehydrated air through a circulatory system, said circulatory system dehydrating the air, condensing the solvent fumes, and withdrawing solvents from the freshly coated articles.

15. A process of curing a coating material applied to the surface of an article from a solution of coating material dissolved in highly volatile solvents, said process including the steps of subjecting the freshly coated article to the air at room temperature in a circulatory system, said circulatory system reducing the air pressure in the system to a subatmospheric pressure, reducing the dew-point below the atmospheric dew-point, condensing the fumes from the solvent from the air, and withdrawing solvents from the coated articles, said circulatory system continuously circulating the air.

16. A process of curing a freshly applied coating material having volatile solvents therein, said process including the step of subjecting the freshly coated article to dehydrated air having solvent fumes therein, said dehydrated air being maintained at room temperature and having a subatmospheric pressure approximately three pounds less than atmospheric pressure.

17. The process of curing a freshly applied coating material having volatile solvents therein, said process including the steps of subjecting the freshly coated article to air having solvent fumes therein, said air being maintained at room temperature and having a subatmospheric pressure approximately three pounds less than atmospheric pressure, and dehydrating said air so as to remove the moisture content thereof.

18. The process of curing a freshly applied coating material having volatile solvents therein, said process including the steps of subjecting the freshly coated article to air maintained at room temperature and having a subatmospheric pressure approximately three pounds less than atmospheric pressure, dehydrating said air, and controlling the solvent fume content of the air.

ELVIN M. BRIGHT.